United States Patent
Hayakawa et al.

(10) Patent No.: US 6,445,654 B1
(45) Date of Patent: Sep. 3, 2002

(54) RECORDING/REPRODUCING METHOD AND DEVICE WITH SUPPLEMENTARY DATA STORAGE AND OUTPUT

(75) Inventors: Hiroyuki Hayakawa; Tamotsu Ito, both of Yokohama; Keiji Nagayama, Hitachinaka; Susumu Yoshida, Yokohama; Akinobu Watanabe, Yokohama; Katsuhiko Tonami, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/623,569
(22) PCT Filed: Jul. 28, 2000
(86) PCT No.: PCT/JP00/05105
§ 371 (c)(1), (2), (4) Date: Sep. 6, 2000
(87) PCT Pub. No.: WO02/11138
PCT Pub. Date: Feb. 7, 2002

(51) Int. Cl.$^7$ ................................................. G11B 5/09
(52) U.S. Cl. ........................... 369/47.23; 369/53.37; 369/124.06
(58) Field of Search .................... 369/47.15, 47.23, 369/47.24, 47.28, 47.3, 47.32, 47.55, 53.37, 53.45, 124.06

(56) References Cited

FOREIGN PATENT DOCUMENTS

| JP | 04-088772 | 3/1992 |
| JP | 8-287598 | 11/1996 |
| JP | 08-287598 | * 11/1996 |
| JP | 2000-035800 | 2/2000 |

* cited by examiner

Primary Examiner—Paul W. Huber
(74) Attorney, Agent, or Firm—McDermott, Will & Emery

(57) ABSTRACT

In a DVD video player with a built-in CD-R drive, until it reaches the state that the data of an optical disk can be reproduced, the output is switched into the reproduction output from a flash memory, a record medium that is quick to start reading. This makes it possible to develop user interfaces such as: voluntarily reproducing an audio information from the flash memory to add music sounds or sounds with special effects to the screen saver, in replacement of the optical disk drive that cannot read data during the screen saver being in operation or being in standby; reproducing the sounds with special effects; reproducing click sounds in response to a key input from the key or the remote control unit; and announcing to inform of the state to the user.

12 Claims, 4 Drawing Sheets

RECORDING/REPRODUCING METHOD AND DEVICE WITH SUPPLEMENTARY DATA STORAGE AND OUTPUT

This application is a 371 of PCT/JP00/05105, filed Jul. 28, 2000.

TECHNICAL FIELD

The present invention relates to a digital information recording/reproducing device using a recordable optical disk drive. More specifically it relates to a digital information recording/reproducing device that records an information reproduced by the optical disk drive or an information inputted from an external device, on a first record medium such as an optical disk, as well as on a second record medium whose read-out speed of information is higher than that of the first record medium such as a flash memory, and that, when reproducing the information, first reads out it from the second record medium for output and then switches the output into a reproduction output from the first record medium.

BACKGROUND ART

The Japanese Published Unexamined Patent Application No. 2000-35800 discloses the technique relating to a device that compresses an inputted audio information, records the compressed information on a solid state record medium such as a flash memory, and expands to reproduce it.

The foregoing document describes the technique that compresses an inputted audio information, records it on a solid state record medium such as a flash memory, and expands to reproduce it. However, the document does not give any remarks to the technique that compresses the information, records on an optical disk, a large-capacity record medium such as a DVD-RAM (Digital Versatile Disc-Random Access Memory) or a CD-R (Compact Disc Recordable), and expands to reproduce it. In other words, the foregoing technique does not refer to the defect of slowness accompanied by the mechanical operation of the optical disk drive, and does not also refer to the state in which the optical disk drive cannot read out information because of the optical disk drive being in standby or being in recording.

The invention aims at providing a digital information recording/reproducing device that, when a user wishes to quickly reproduce an information by compensating the slowness in the mechanical operation of an optical disk drive and the like, or when the information cannot be read because of the optical disk drive being in standby or being in recording or the like, reads in replacement of the optical disk drive the information from a flash memory or the like whose read-out speed is higher than that of the optical disk drive, and thereby develops user interfaces.

DISCLOSURE OF THE INVENTION

To accomplish the foregoing object, as one of the invention, provided is a digital information recording/reproducing device constituted as follows.

The digital information recording/reproducing device is provided with an information compression unit that compresses an inputted digital information; a record control unit that have a control over recording a compressed information inputted from the information compression unit, on a first record medium as well as on a second record medium whose read-out speed of information is higher than that of the first record medium; an information signal selection unit that switches a first compressed information read from the first record medium and a second compressed information read from the second record medium for output, and an information expansion unit that expands a compressed information inputted from the information signal selection unit to output a digital information.

Methods and devices for recording/reproducing digital signals are disclosed. In one embodiment, a device for recording/reproducing digital signals includes an information compression unit, a record control unit, and an information expansion unit. The information compression unit compresses inputted digital information. The record control unit controls writing of compressed information from the information compression unit to a first record medium and a second record medium. In one aspect, the second record medium may have read-out speed of information higher than that of the first record medium. In another aspect, at least some of the compressed information written to the second record medium is also written to the first record medium. The information signal selection unit selects between first compressed information read out from the first record medium and second compressed information read out from the second record medium for output. The information expansion unit expands compressed information from the information signal selection unit. In one aspect, in response to the first record medium being in at least one of a halt state and a recording state, the information signal selection unit selects the second compressed information read out from the second record medium for output.

In another embodiment, a method for recording/reproducing digital signals is provided. The method may include the steps of: generating compressed information by compressing inputted digital information; controlling writing the compressed information to a first record medium and a second record medium whose read-out speed of information is higher than that of the first record medium; and, responsive to the first record medium being in at least one of a halt state and a recording state, outputting information read out from the second record medium. In one aspect, at least some of the compressed information written to the second record medium is also written to the first record medium.

BRIEF DESCRIPTION OF THE DRAWINGS

Other objects and advantages of the invention will become apparent during the following discussion of the accompanying drawings, wherein.

BEST MODE FOR CARRYING OUT THE INVENTION

The best mode for carrying out the invention will be described with reference to FIG. 1 and FIG. 2. The example shown in FIG. 1 illustrates a block diagram of a DVD video player with a built-in CD-R drive, to which the invention is applied.

Figure 1:
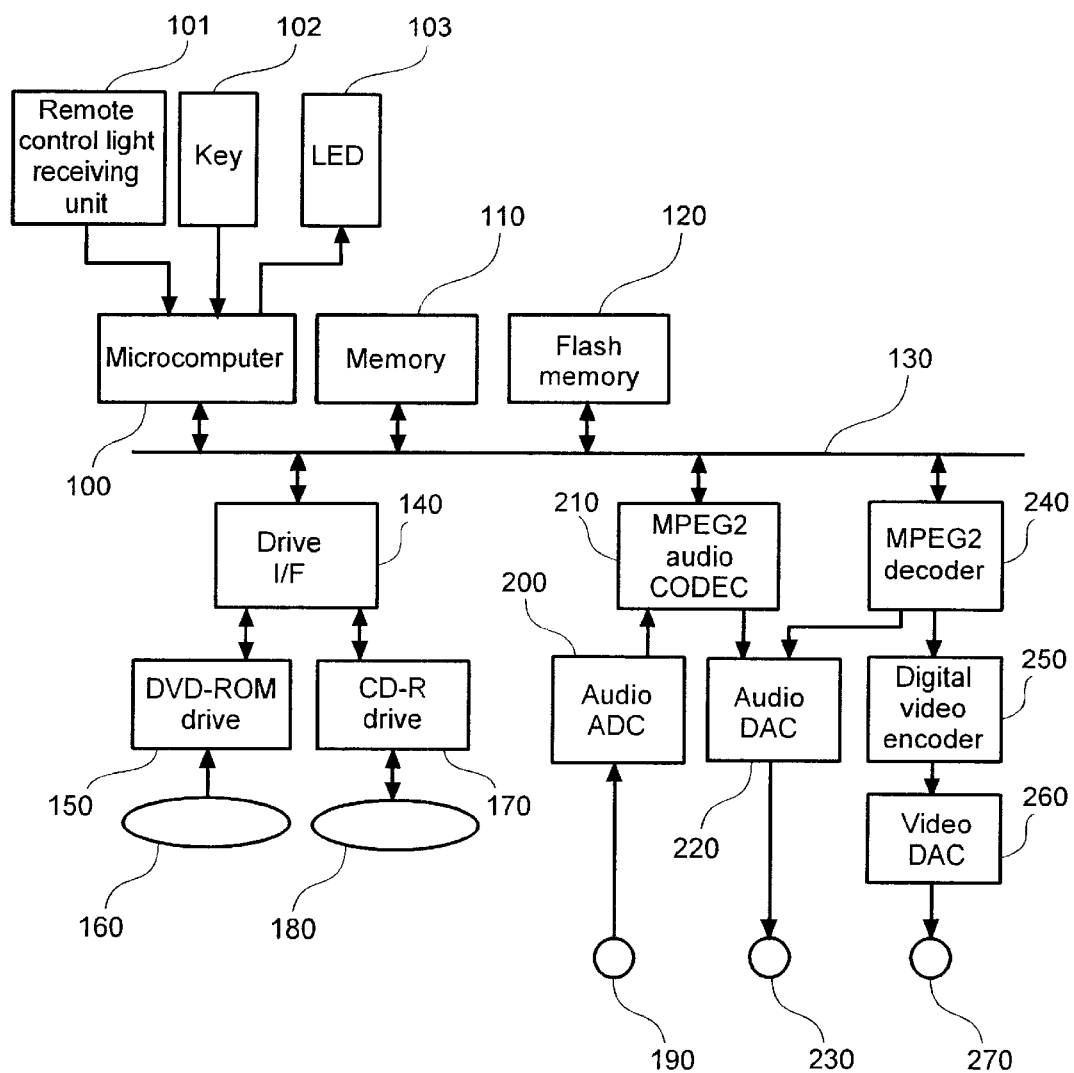
FIG. 1 is a block diagram of a DVD video player with a built-in CD-R drive to which the invention is applied.

In FIG. 1, 100 denotes a microcomputer, 101 a remote control light receiving unit, 102 a key, 103 a LED, 110 a memory, 120 a flash memory, 130 a system bus, 140 a drive I/F, 150 a DVD-ROM (Digital Versatile Disk Read Only Memory) drive, 160 an optical disk, 170 a CD-R drive, 180 an optical disk, 190 an audio input terminal, 200 an audio ADC (Analog to Digital Converter), 210 a MPEG (Moving Picture Expert Group) audio CODEC, 220 an audio DAC (Digital to Analog Converter), 230 an audio output terminal, 240 a MPEG2 decoder, 250 digital video encoder, 260 a video DAC, and 270 a video output terminal.

In the DVD video player with the build-in CD-R drive, the microcomputer 100 controls the aforementioned constituent units. Actually in the data transfer between the devices of the flash memory 120, drive I/F 140, MPEG audio CODEC 210, MPEG2 decoder 240, etc., the DMA transfer is executed on the system bus 130 by a DMAC (Direct Memory Access Controller) within the microcomputer 100.

Figure 2:
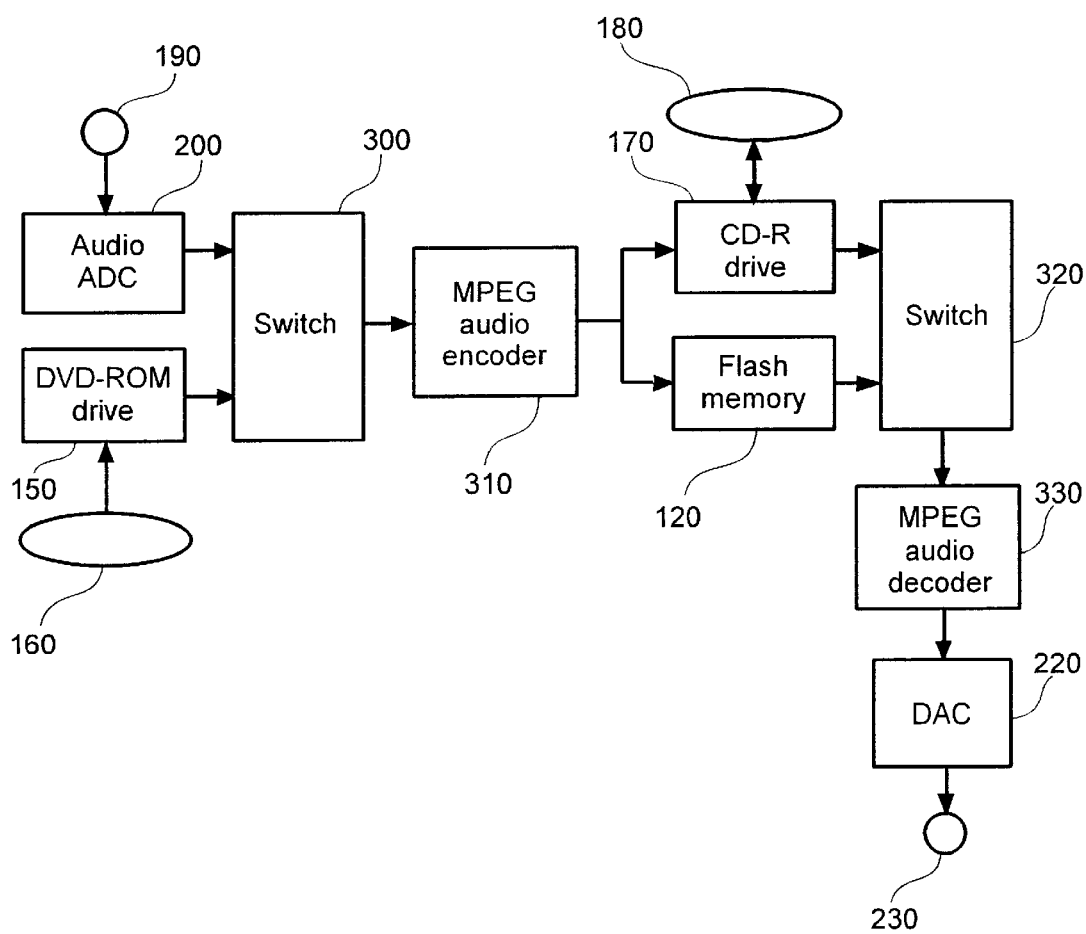
FIG. 2 is a typical chart illustrating the flow of audio signals that are transferred on the system bus 130.

FIG. 2 illustrates the flow of the audio signals transferred on the system bus 130. In the following description, the recording and reproducing of audio data will be explained as an example, but the audio data may be replaced by video data, program data, or file data.

FIG. 2 is a typical chart that conceptually illustrates the flow of audio signals transferred on the system bus 130. In FIG. 2, 120 denotes the flash memory illustrated in FIG. 1, 110 the DVD-ROM drive illustrated in FIG. 1, 160 the optical disk illustrated in FIG. 1, 170 the CD-R drive illustrated in FIG. 1, 180 the optical disk illustrated in FIG. 1, 190 the audio input terminal illustrated in FIG. 1, 200 the audio ADC illustrated in FIG. 1, 220 the audio DAC illustrated in FIG. 1, 230 the audio output terminal illustrated in FIG. 1, 300 a switch, 310 a MPEG audio encoder, 320 a switch, and 330 a MPEG audio decoder.

The switch 300 and the switch 320 are realized on the system bus 130 illustrated in FIG. 1 by software. The MPEG audio encoder 310 and the MPEG audio decoder 330 are realized by the function incorporated in the MPEG audio CODEC 210.

To explain the principle of the invention, the internal operation of the DVD video player with the built-in CD-R drive shown in FIG. 1 will be explained with reference to the typical chart illustrating the flow of the audio signals that are transferred on the system bus 130 shown in FIG. 2.

In FIG. 2, audio signals inputted from the external of the DVD video player with the built-in CD-R drive are inputted through the audio input terminal 190, converted into digital audio signals by the audio ADC 200, and inputted to the switch 300. Digital audio signals reproduced from the optical disk 160, for example a CD (Compact Disc), reproduced by the DVD-ROM drive 150, are inputted to the switch 300 as well.

The switch 300 selects, by the control of the microcomputer 100 shown in FIG. 1, either one of the two digital audio signals inputted, and outputs the result. The MPEG audio encoder 310 compresses the digital audio signals inputted from the switch 300 in accordance with the format MP3 (MPEG Audio Layer III).

The digital audio signals compressed in accordance with the format MP3 are recorded on the optical disk 180 loaded on the CD-R drive 170 as well as on the flash memory 120.

The flash memory 120 can be implemented by using a part of the memory that stores the control program of the DVD video player with the built-in CD-R drive, or it can also be implemented by using a detachable memory, for example, a flash memory included in an IC card connected to the DVD video player with the built-in CD-R drive.

Next, the reproducing procedure of the audio information recorded on the flash memory 120 or the optical disk 180 will be explained. After loading the optical disk 180 on the CD-R drive 170 till reaching the state that data can be read from the optical disk 180, about 30 seconds at average are needed as the total of a time required for increasing the rotation speed of the disk, a time (seek time) required for moving the pickup to a specified position, and a time (disk check time) required for judging which type of optical disks the loaded optical disk 180 belongs to, etc. During that time, the data from the optical disk 180, namely, the recorded audio information cannot be read out.

Accordingly, the input to the switch 320 is switched into the input from the flash memory 120, and the audio information reproduced from the flash memory 120 is outputted. The MPEG audio decoder 330 expands the audio information inputted from the switch 320, namely, the audio information reproduced from the flash memory 120 for output. The audio DAC 220 converts the inputted digital audio signals into analog audio signals, and outputs the result to the equipment connected to the external through the audio output terminal 230.

Next, the microcomputer 100 shown in FIG. 1 controls the switch 320 to select and switch the input from the CD-R drive 170 for output, when detecting that the seek operation to the optical disk 180 is finished and the disk check is completed. As the reproduction from the optical disk 180 begins, when the audio information read from the optical disk 180 is compressed in accordance with the format MP3, for example, the MPEG audio decoder 330 expands the audio information and outputs the result. On the other hand, when the audio information is not compressed, the MPEG audio decoder 330 detects it and outputs the audio information as it is. The audio DAC 220 converts the inputted digital audio signals into analog audio signals, and outputs the result to the equipment connected to the external through the audio output terminal 230.

Next, the actual internal operation of the DVD video player with the built-in CD-R drive will be described with reference to FIG. 1.

First, the recording operations to the flash memory 120 and to the optical disk 180 will be explained. The audio input source to be recorded on the flash memory 120 and the optical disk 180 includes the audio signals inputted through the audio input terminal 190 from the external equipment, and the audio signals from the optical disk 160 reproduced by the DVD-ROM drive 150.

Assuming that the optical disk 160 loaded on the DVD-ROM drive 150 is a CD, CD-R, or CD-RW, when the microcomputer 100 detects the key input from the remote control light receiving unit 101 or the key inputted from the key 102 (of the main body), the microcomputer 100 analyzes which key is inputted. When the key on the analysis is the key to start the recording of signals reproduced by the DVD-ROM drive 150, the microcomputer 100 shifts into the operation to start the recording by the DVD-ROM drive 150.

The microcomputer 100 accesses the drive I/F 140 through the system bus 130 and controls the DVD-ROM drive 150 to make it readable. When the DVD-ROM drive 150 is made readable, the DVD-ROM drive 150 starts reading the audio information from the optical disk 160. The drive I/F 140 extracts the digital audio signals from the read out audio information and outputs them. The DMAC included in the microcomputer 100 transfers by the DMA the digital audio signals to a track buffer provided in the memory 110 through system bus 130. The track buffer is a memory area exclusive for the digital audio signal reproduction, allocated in the memory 110.

At the next cycle, the DMAC included in the microcomputer 100 transfers by the DMA the digital audio signals read from the track buffer provided in the memory 110 to the MPEG audio encoder 310 (not illustrated) included in the MPEG audio CODEC 210. The MPEG audio encoder 310 compresses the inputted digital audio signals in accordance with the format MP3, for example, and stores the result in a buffer included in the MPEG audio CODEC 210. Similarly, the DMAC included in the microcomputer 100 reads this through the system bus 130 and transfers it to the flash memory 120 to record it therein.

Synchronizing with this, at the next cycle, when the CD-R drive 170 is loaded with a recordable optical disk 180, for example, a CD-R disk or a CD-RW disk, the DMAC included in the microcomputer 100 transfers by the DMA the audio information, namely, the digital audio signals compressed by the MPEG audio encoder 310, to the drive I/F 140 through the system bus 130. The microcomputer 100 controls the drive I/F 140 to record this audio information on the optical disk 180.

On the other hand, when the optical disk 160 loaded on the DVD-ROM drive 150 is a CD-ROM OR a DVD-ROM containing the audio information recorded in accordance with the format MP3, similarly the microcomputer 100 accesses the drive I/F 140 through the system bus 130 and controls the DVD-ROM drive 150 to make it readable. When the DVD-ROM drive 150 is made readable, the DVD-ROM drive 150 starts reading the audio information from the optical disk 160. Here, when the drive I/F 140 detects that the information recorded on the optical disk 160 is the audio information recorded in accordance with the format MP3, the drive I/F 140 informs the microcomputer 100 of this.

The drive I/F 140 extracts the audio information of the format MP3 from the audio information read out and outputs the extracted audio information. The DMAC included in the microcomputer 100 transfers by the DMA the audio information of the format MP3 to the track buffer provided in the memory 110 through the system bus 130.

At the next cycle, the DMAC included in the microcomputer 100 reads this through the system bus 130 and transfers it to the flash memory 120 to record it therein.

At the same time at the next cycle, when the CD-R drive 170 is loaded with a recordable optical disk 180, for example, a CD-R disk or a CD-RW disk, the DMAC included in the microcomputer 100 transfers by the DMA the audio information of the format MP3 to the drive I/F 140 through the system bus 130. The microcomputer 100 controls the drive I/F 140 to record this audio information on the optical disk 180.

Further, when the optical disk 160 loaded on the DVD-ROM drive 150 is a DVD video disk or a DVD audio disk, the microcomputer 100 accesses the drive I/F 140 through the system bus 130 and controls the DVD-ROM drive 150 to make it readable. When the DVD-ROM drive 150 is made readable, the DVD-ROM drive 150 starts reading the data from the optical disk 160. Here, when the drive I/F 140 detects that the optical disk 160 is a DVD video disk or a DVD audio disk, the drive I/F 140 informs the microcomputer 100 of the type of the disk.

The drive I/F 140 extracts, for example, the program stream of the DVD video from the read out audio information and outputs the result.

Figure 3:
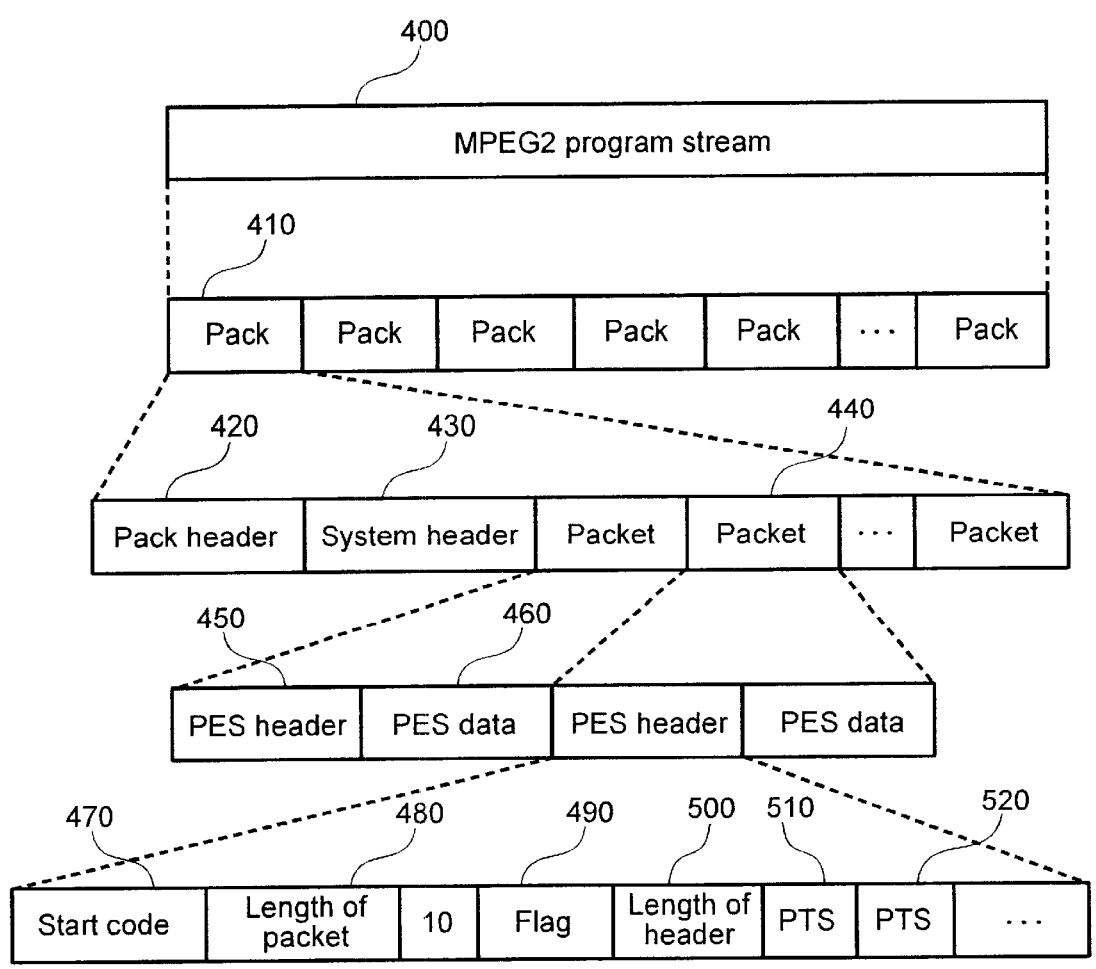
FIG. 3 is a chart illustrating the configuration of the program stream of the DVD video.

FIG. 3 is a chart illustrating the configuration of the program stream of the DVD video.

As shown in FIG. 3, an MPEG2 program stream 400 includes a plurality of packs 410, and each pack 410 includes a pack header 420, a system header 430, and a plurality of packets 440. The packet 440 includes a PES header 450 and a PES data 460, and the PES header 450 includes a PTS 510 and a DTS 520 which are time information. Whether or not the PTS 510 and DTS 520 is present is described in a flag 490, however if the packet 440 is an audio packet, the PES header 450 includes the PTS 510 only, and does not include the DTS 520.

First, the microcomputer 100 controls the drive I/F 140 to acquire the information concerning the type of the optical disk 160 loaded on the DVD-ROM drive 150. If the optical disk 160 loaded thereon is a DVD video disk, for example, the DVD-ROM drive 150 executes a mutual certification between the DVD-ROM drive 150 and the DVD video disk 160, and confirms that it is a proper drive and disk.

The microcomputer 100 controls the drive I/F 140 to read the data of the DVD video disk from the DVD-ROM drive 150.

The drive I/F 140 extracts the MPEG2 program stream 400 of the DVD video from the reproduced data, and executes the DMA transfer to a reproducing stream buffer allocated on the memory 110 through the system bus 130.

While monitoring the accumulated quantity of the MPEG2 program stream 400 stored in the reproducing stream buffer allocated on the memory 110, the microcomputer 100 transfers the MPEG2 program stream 400 stored in the reproducing stream buffer to the MPEG2 decoder 240, in accordance with the request from the MPEG2 decoder 240.

The MPEG2 decoder 240 analyzes the header information of the MPEG2 program stream 400 inputted, decodes the ciphers, extracts separately a digital video data and a digital audio data that are compressed, and transfers the result to a video signal expansion circuit and a audio signal expansion circuit provided in the MPEG2 decoder 240.

The MPEG2 decoder 240 expands separately the digital video data and the digital audio data, and transfers the digital audio signals to the audio DAC 220 and the digital video signals to the digital video encoder 250.

The audio DAC 220 converts the inputted digital audio signals into the analog for output. Similarly, the digital video encoder 250 converts the inputted digital video signals, for example, into the digital NTSC (National Television Standard Committee) signals for output. Further the video DAC 260 converts the signals into the analog NTSC signals for output.

The DMAC included in the microcomputer 100 transfers by the DMA the digital audio signals expanded by the audio signal expansion circuit provided in the MPEG2 decoder 240 to the track buffer provided in the memory 110 through the system bus 130.

At the next cycle, the DMAC included in the microcomputer 100 transfers by the DMA the digital audio signals read from the track buffer provided in the memory 110 to the MPEG audio encoder 310 included in the MPEG audio CODEC 210.

The MPEG audio encoder 310 compresses the inputted digital audio signals in accordance with the format MP3, for example, and stores the result in the buffer included in the MPEG audio CODEC 210. Similarly, the DMAC included in the microcomputer 100 reads this through the system bus 130 and transfers it by the DMA to the flash memory 120 to record it therein.

Synchronizing with this, at the next cycle, when the CD-R drive 170 is loaded with a recordable optical disk 180, for example, a CD-R disk or a CD-RW disk, the DMAC included in the microcomputer 100 transfers by the DMA the audio information, namely, the digital audio signals compressed in accordance with the format MP3 by the MPEG audio encoder 310 to the drive I/F 140 through the system bus 130. The microcomputer 100 controls the drive I/F 140 to record this audio information on the optical disk 180.

Next, when analog audio signals, for example, are inputted through the audio input terminal 190 from the external equipment, the analog audio signals are inputted to the audio ADC 200 through the audio input terminal 190. And, the audio ADC 200 converts the analog audio signals inputted into the digital audio signals to output. Further, the digital audio signals are inputted to the MPEG audio CODEC 210.

The MPEG audio encoder 310 provided in the MPEG audio CODEC 210 compresses the digital audio signals in accordance with the format MP3, for example, and stores the result in the buffer provided in the MPEG audio CODEC 210. And similarly, the DMAC included in the microcomputer 100 reads this through the system bus 130 and transfers it by the DMA to the flash memory 120 to record it therein.

Synchronizing with this, when the CD-R drive 170 is loaded with a recordable optical disk 180, for example, a CD-R disk or a CD-RW disk, the DMAC included in the microcomputer 100 transfers by the DMA the audio information, namely, the digital audio signals compressed by the MPEG audio encoder 310 to the drive I/F 140 through the system bus 130. The microcomputer 100 controls the drive I/F 140 to record this audio information on the optical disk 180 loaded in the CD-R drive 170.

Secondly, the reproducing operations from the flash memory 120 and the optical disk 180 will be explained. When the microcomputer 100 detects the key inputted from the remote control light receiving unit 101 or the key input from the key 102 (of the main body), the microcomputer 100 analyzes which key is inputted. The key on the analysis is the key to start the reproduction by the CD-R drive 170, the microcomputer 100 shifts into the operation to start the reproduction by the CD-R drive 170. The microcomputer 100 transfers the reproduction start command to the CD-R drive 170 through the drive I/F 140. However, since the CD-R drive 170 needs the time required that the data can be read from the optical disk 180, namely the time required for the seek time and the disk check time and the like, the microcomputer 100 starts the reproduction of the audio information from the flash memory 120 during that time.

First, in case of reproduction from the flash memory 120, the DMAC included in the microcomputer 100 transfers by the DMA the audio information recorded in a specified area allocated in the flash memory 120 to the MPEG audio CODEC 210. Next, the microcomputer 100 transfers the command to start the expansion to the MPEG audio decoder 330 included in the MPEG audio CODEC 210 through the system bus 130. Receiving this command, the MPEG audio decoder 330 included in the MPEG audio CODEC 210 analyzes the compression format of the data inputted to the MPEG audio CODEC 210, and if the MPEG audio decoder 330 judges that it is an expandable compression format, the MPEG audio decoder 330 starts expansion of the digital audio signals and output it.

The audio DAC 220 converts the digital audio signals inputted thereto into the analog signals to output the result.

Next, receiving an information that the CD-R drive 170 finishes the disk check and reaches the state of the reproduction possible, the microcomputer 100 controls the drive I/F 140 to start the reproduction of the optical disk 180. Synchronizing with this, when the optical disk 180 loaded in the CD-R drive 170 is, for example, a CD-ROM disk in which the audio information compressed in accordance with the format MP3 is recorded, the microcomputer 100 controls the drive I/F 140.

The CD-R drive 170 reads the data of the audio information compressed in accordance with the format MP3 from the CD-R drive 170, and the drive I/F 140 extracts the audio information compressed in accordance with the format MP3 from the reproduced data, and executes the DMA transfer to the reproducing stream buffer allocated on the memory 110 through the system bus 130.

While monitoring the accumulated quantity of the reproducing stream buffer allocated on the memory 110, the microcomputer 100 transfers the stored audio information compressed in accordance with the format MP3 to the MPEG2 decoder 240, in accordance with the request from the MPEG2 decoder 240.

The MPEG2 decoder 240 analyzes the inputted audio information compressed in accordance with the format MP3, and if it detects that the inputted data is the audio information compressed in accordance with the format MP3, the MPEG2 decoder 240 transfers the data to the audio signal expansion circuit provided in the MPEG2 decoder 240.

The audio signal expansion circuit provided in the MPEG2 decoder 240 expands the inputted audio information of the format MP3, and outputs the digital audio signals to the audio DAC 220.

At that moment, the microcomputer 100 controls the audio DAC 220 to select the input from the MPEG2 decoder 240 and output it, and switches the reproduction output from the flash memory 120 that was reproduced till that time into the output of the data read by the CD-R drive 170, expanded by the MPEG2 decoder 240. The audio DAC 220 converts the inputted digital audio signals into the analog to output the result.

In this manner, the microcomputer 100 is able to select the reproduction output from the flash memory 120, a record medium that is quick to start reading, until it detects that the seek operation and the disk check of the optical disk 180 is completed and then data can be reproduced from the optical disk 180. This can develop user interfaces such as reproducing sounds with special effects and announcing to inform the user of the state of the microcomputer 100 during the time that the audio information cannot be read due to the seek operation or the disk check operation of the optical disk 180.

Further, when the DVD-video player with the built-in CD-R drive is left as it is longer than a specified time with the power supply connected, when the screen saver is operated in order to prevent the baking of the TV screen connected to the DVD-video player with the built-in CD-R drive, or when the DVD-video player is put into standby to prevent an unnecessary power consumption, the rotation of the DVD-ROM drive 150 and the CD-R drive 170 is halted. Accordingly, it is impossible to reproduce the audio information from the optical disk 160 or the optical disk 180 during that time, and instead, it is possible to voluntarily reproduce the audio information recorded in advance on the flash memory 120 or the audio information that a user has recorded thereon and also to add, for example, a music sound and sounds with special effects to the screen saver, and the like.

In this case, the microcomputer 100 contains a timer therein and starts to operate the timer based on that the rotation of the DVD-ROM drive 150 and the CD-R drive 170 is halted, and when the key 102 is pressed, the microcomputer 100 halts this timer. When the value of this timer exceeds a reference value, the microcomputer 100 detects that the DVD-video player with the built-in CD-R drive is left as it is longer than a specified time with the power supply connected; and using the OSD (On Screen Display) function that the MPEG2 decoder 240 holds, the microcomputer 100 is able to generate an optional screen of the screen saver, voluntarily reproduce the audio information recorded in advance on the flash memory 120 or the audio information that the user has recorded thereon, and add a music sound to the screen of the screen saver.

The user is able to voluntarily set the time required that the screen of the screen saver appears, using the key 102 or the remote control unit, through the menu screen presented on the OSD. On the basis of the time that the user sets, the microcomputer 100 calculates the reference value of the timer.

Further, when the optical disk 180 loaded in the CD-R drive 170 is, for example, a CD-R or a CD-RW, and the CD-R drive 170 cannot read the data because of being in recording operation or being in finalizing operation of these disks, it is possible to voluntarily reproduce the audio information recorded in advance on the flash memory 120 or the audio information that the user has recorded thereon, and to add an announcement or music sound or sounds with special effects thereto.

Further, when the key input is received through the key 102 of the DVD video player with the built-in CD-R drive, or through the remote control light receiving unit 101, the reproduction of an optional click sound will recognize the user that the key is pressed.

In the digital video encoder 250 explained in this embodiment of the invention, the inputted digital video signals are converted into the digital NTSC signals, however they can be converted into the signals of other video standards, for example, the PAL system, the SECAM system, and the RGB signals, etc.

In the example explained in this embodiment of the invention, a CD-R disk or a CD-RW disk is adopted as an example of a record medium for recording. However, the other record media can be employed, such as DVD-RAM (Digital Versatile Disk Random Access Memory), DVD-R (Digital Versatile Disk Recordable), DVD-RW (Digital Versatile Disk ReWritable), magneto-optical disk, magnetic disk, hard disk, etc.

As an example for the drive I/F 140 explained in this embodiment of the invention, there are, for example, the ATAPI (Attachment with Packet Interface), SCSI (Small Computer System Interface), USB (Universal Serial Bus), IEEE 1394, etc.

Further, in this embodiment of the invention, the DDVD-ROM drive is used on the reproduction side, and the CD-R drive is used on the recording side. However, the reproduction side takes on, for example, a DVD-RAM drive, a DVD-R drive, a DVD-RW drive, a hard disk drive, and a flash memory; and the recording side takes on, for example, a DVD-RAM drive, a DVD-R drive, a DVD-RW drive, a hard disk drive, and a flash memory.

In the example shown in FIG. 1, as an example of the video signals to be outputted and the audio signals to be inputted and outputted, the analog signals are employed for explanation. However, the other digital system, for example, the DV format can be used as the video signals; and the digital coaxial input output and the optical input output, etc., can be used as the audio signals.

When the invention is applied, the audio information reproduced by the optical disk drive and the audio information inputted from the external equipment are compressed in accordance with the format MP3, for example, and the compressed information are recorded on a DVD-RAM disk or on a CD-R disk, and at the same time they are recorded on a non-volatile memory such as a flash memory or the like in advance. Thereby, at reproduction, when it takes much time for reading from the optical disk, the reading is executed in prior to this from the flash memory and the expansion is executed to output the audio information.

Thereafter, when the information cannot be read during the optical disk drive being in standby or being in recording, the output is switched into the data from the optical disk, or when the mechanical operation of the optical disk drive is slow, the information is read from the flash memory in replacement of the optical disk drive. Thus, the embodiment makes it possible to develop user interfaces, such as adding effects with special sounds to the screen saver, and the like.

Figure 4:
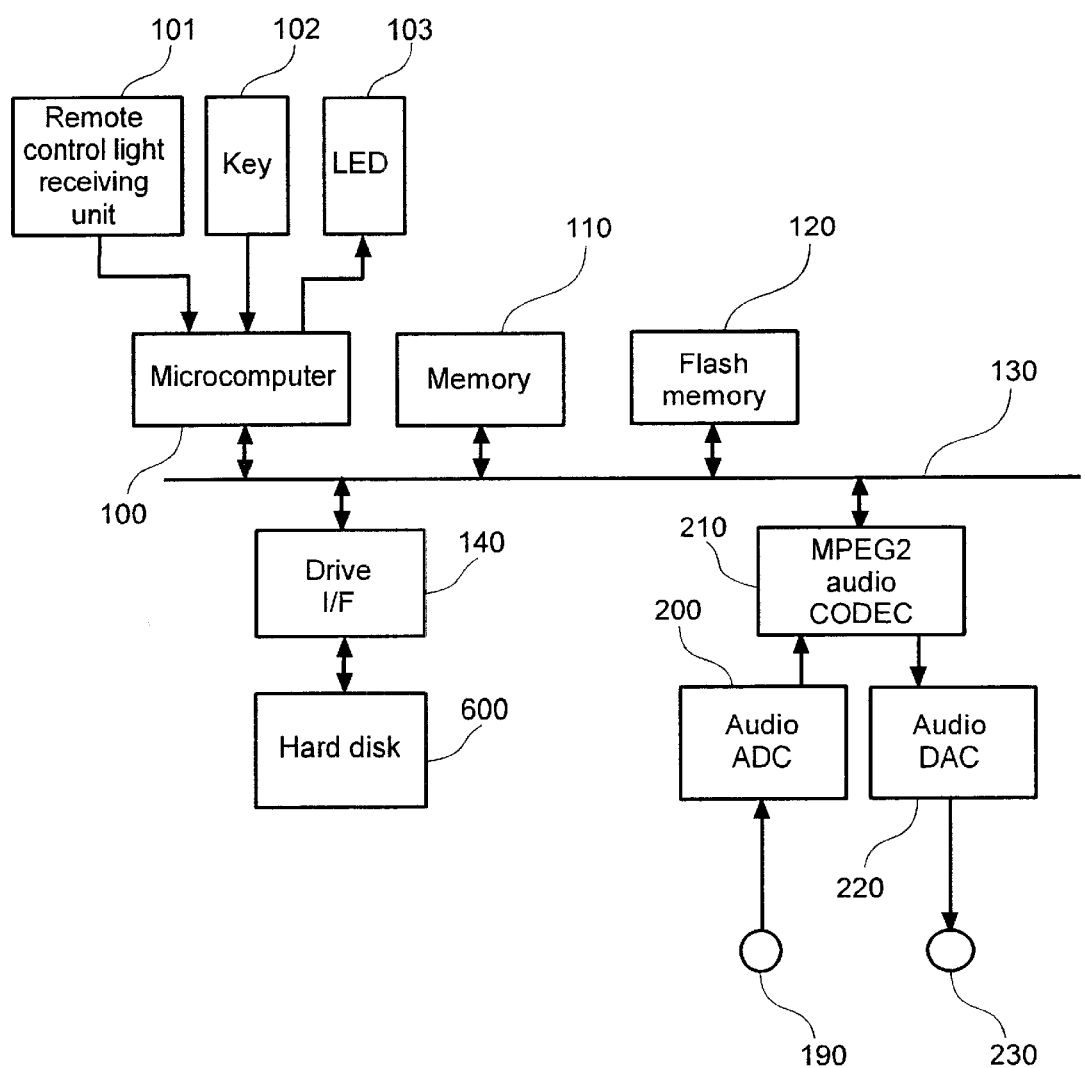
FIG. 4 is a block diagram of a hard disk recorder to which the invention is applied.

Next, another embodiment of the invention will be described with reference to FIG. 4. FIG. 4 illustrates a configuration of this embodiment in which the invention is applied to a hard disk recorder.

In FIG. 4, in the same manner as FIG. 1, 100 denotes the microcomputer, 101 the remote control light receiving unit as shown in FIG. 1, 102 the key, 103 the LED, 110 the memory, 120 the flash memory, 130 the system bus, 140 the drive I/F, 190 the audio input terminal, 200 the audio ADC, 210 the MPEG audio CODEC, 220 the audio DAC, 230 the audio output terminal, and 600 a hard disk.

First, recording operation of the hard disk recorder in FIG. 4 will be explained.

The hard disk 600 is a very small type, such as one conforming to the standard of the PC card or the compact flash, and is assumed to be a hard disk detachable from the main frame. When the drive I/F 140 detects that the hard disk 600 is connected to the main body of the hard disk recorder, the drive I/F 140 informs of this state to the microcomputer 100 through the system bus 130.

The microcomputer 100, receiving this signal, issues to the drive I/F 140 a command to read the volume name of the hard disk 600 out of the hard disk 600.

Receiving this command, the drive I/F 140 supplies the hard disk 600 with the power supply, rotates the disk, and reads the volume name of the drive. The microcomputer 100 compares the volume name read from the hard disk 600 and volume names stored in a volume name management area allocated on the flash memory 120. In the volume name management area allocated on the flash memory 120, the volume names registered and the addresses of the data area corresponding to the volume names are recorded.

In the data area is recorded the information concerning the music recorded in the volume and the record portion, such as the number of music and record time, the music recorded on the flash memory 120 and the leading address of the record portion, and the address on the hard disk 600 corresponding to this, and the like.

If the comparison results in that there is not a coincident volume name, the volume name read from the hard disk 600 is newly registered on the flash memory 120.

Further, the data area corresponding to the volume name newly registered is allocated on the flash memory 120, and the leading address thereof is recorded in the volume name management area.

The sound source recorded by the hard disk recorder is directly inputted through the audio input terminal 190 from the external equipment. First, when the microcomputer 100 detects the key inputted from the remote control light receiving unit 101 or the key input from the key 102 (of the main body), the microcomputer 100 analyzes which key is inputted. If the analysis results in that that is the key to start recording, the microcomputer 100 shifts into the operation to start recording.

The microcomputer 100 accesses the drive I/F 140 through the system bus 130, and controls the hard disk 600 to make it recordable.

The analog audio signals inputted through the audio input terminal 190 are converted into the digital audio signals, and then inputted to the MPEG audio encoder 310 included in the MPEG audio CODEC 210.

The MPEG audio encoder 310 compresses the inputted digital audio signals in accordance with the format MP3, for example, and stores the result in the buffer included in the MPEG audio CODEC 210. The DMAC included in the microcomputer 100 reads this through the system bus 130, transfers it to the flash memory 120 to record it therein. The recording on the flash memory 120 is made only for the first ten seconds, for example, from the start of recording; and the microcomputer 100 halts the recording on the flash memory 120, after the ten seconds pass from the start of recording.

Synchronizing with this, the DMAC included in the microcomputer 100 transfers by the DMA the digital audio information compressed by the MPEG audio encoder 310 to the drive I/F 140 through the system bus 130. The drive I/F 140 controls the hard disk 600 to write the same data as recorded on the flash memory 120. However, the microcomputer 100 continues to record on the hard disk 600, even after the ten seconds pass from the start of recording.

Next, the reproducing operation of the hard disk recorder will be explained.

When the microcomputer 100 detects the key input from the remote control light receiving unit 101 or the key input from the key 102 (of the main body), the microcomputer 100 analyzes which key is inputted. The key on the analysis is the key to start reproduction, the microcomputer 100 shifts into the operation to start reproduction.

The microcomputer 100 accesses the drive I/F 140 through the system bus 130, and controls the hard disk 600 to make it reproducible.

However, since the hard disk 600 starts rotating the disk loaded inside after receiving the command from the drive I/F 140, it takes several seconds or more till reaching the rotation speed where the reproduction can be carried out.

Accordingly, the microcomputer 100 searches the data area on the flash memory 120, and detects the address on the flash memory 120 where, for example, the music and the record portion designated by a user are recorded, and the address on the hard disk 600.

First, the DMAC included in the microcomputer 100 searches the data area on the flash memory 120, reads the data from the leading of the address of the music and the record portion designated by the user, and transfers the data by the DMA to the MPEG audio decoder 330 included in the MPEG audio CODEC 210. Next, the microcomputer 100 sends a command to start the compression to the MPEG audio decoder 330 included in the MPEG audio CODEC 210 through the system bus 130. Receiving this command, the MPEG audio decoder 330 included in the MPEG audio CODEC 210 analyzes the compression format of the data inputted to the MPEG audio CODEC 210. If it is judged as the compression format that the MPEG audio decoder 330 is able to expand, the MPEG audio decoder 330 starts to expand and outputs the digital audio signals expanded.

The audio DAC 220 converts the inputted digital audio signals into the analog audio signals to output the result.

Next, when the rotation of the disk loaded inside the hard disk 600 reaches the reproducible speed, the drive I/F 140 detects it and informs the microcomputer 100 of it.

Receiving this, the DMAC included in the microcomputer 100 halts the reading of the data from the flash memory 120, and instead controls the drive I/F 140 to switch into the reading of the data from the hard disk 600, in such a manner that the data transferred to the MPEG audio CODEC 210 do not become discontinuous.

Thus, during the time from the start of rotation of the hard disk 600 till reaching the state that the reproduction can be carried out, the data are read in precedence from the flash memory 120, and at the moment when the reproduction becomes possible, the reproduction is switched into the reading from the hard disk 600. Thereby, the reading of the data becomes possible without waiting for the starting time of the hard disk 600, which makes it possible to provide the hard disk recorder that does not give any feeling of discomfort to a user and develops user interfaces.

The hard disk 600 described in the aforementioned embodiment is assumed to be a small type hard disk detachable from the main frame, which conforms, for example, to the standard of the PC card or the compact flash. However, the invention can be embodied by a universal hard disk that cannot be detached from the main frame.

Industrial Applicability

According to the invention, the audio information reproduced by the optical disk drive and the audio information inputted from the external equipment are compressed in accordance with the format MP3, for example, and the compressed information are recorded on a DVD-RAM disk or on a CD-R disk, and at the same time they are recorded on a non-volatile memory such as a flash memory in advance. Thereby, at reproduction, when it takes much time for reading from the optical disk, the reading is executed in prior to this from the flash memory and the expansion is executed to output the audio information. Thereafter, when the information cannot be read during the optical disk drive being in standby or being in recording, the output is switched into the data from the optical disk, or when the mechanical operation of the optical disk drive is slow, the information is read from the flash memory in replacement of the optical disk drive. Thus, the invention makes it possible to develop user interfaces such as an immediate reproduction without waiting for starting the disk, or adding effects with special sounds to the screen saver.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A digital information recording/reproducing device, comprising:
   an information compression unit that compresses inputted digital information;
   a record control unit for controlling writing of compressed information from the information compression unit to a first record medium and a second record medium whose read-out speed of information is higher than that of the first record medium, wherein at least some of the compressed information written to the second record medium is also written to the first record medium;

an information signal selection unit that selects between first compressed information read out from the first record medium and second compressed information read out from the second record medium for output; and an information expansion unit that expands compressed information from the information signal selection unit;

wherein, in response to the first record medium being in at least one of a halt state and a recording state, the information signal selection unit selects the second compressed information read out from the second record medium for output.

2. The device of claim 1, wherein the first record medium is a recordable optical disc.

3. The device of claim 1, wherein the compressed data is controlled to be written into the first and second record medium at substantially the same time.

4. The device of claim 3, wherein the compressed data is controlled to be written into the first and second record medium synchronously.

5. A digital information recording/reproducing method, comprising the steps of:

generating compressed information by compressing inputted digital information;

controlling writing of the compressed information to a first record medium and a second record medium whose read-out speed of information is higher than that of the first record medium, wherein at least some of the compressed information written to the second record medium is also written to the first record medium; and responsive to the first record medium being in at least one of a halt state and a recording state, outputting information read out from the second record medium.

6. The method of claim 5, wherein the first record medium is a recordable optical disc.

7. The method of claim 5, wherein the compressed data is controlled to be written into the first and second record medium at substantially the same time.

8. The device of claim 7, wherein the compressed data is controlled to be written into the first and second record medium synchronously.

9. A digital information recording/reproducing device, comprising:

compressing means for compressing inputted digital information;

means for controlling writing of compressed information from the compressing means to a first record medium and second record medium whose read-out speed of information is higher than that of the first record medium, wherein at least some of the compressed information written to the second record medium is also written to the first record medium;

selecting means for selecting between first compressed information read out from the first record medium and second compressed information read out from the second record medium for output; and means for expanding compressed information from the selecting means;

wherein, in response to the first record medium being in at least one of a halt state and a recording state, the selecting means selects the second compressed information read out from the second record medium for output.

10. The device of claim 9, wherein the first record medium is a recordable optical disc.

11. The device of claim 9, wherein the compressed data is controlled to be written into the first and second record medium at substantially the same time.

12. The device of claim 11, wherein the compressed data is controlled to be written into the first and second record medium synchronously.

* * * * *